Oct. 29, 1929.  L. F. MOODY  1,733,671
RUNNER BLADING AND METHOD OF FORMING THE SAME
Filed July 29, 1922  7 Sheets-Sheet 1

Oct. 29, 1929.  L. F. MOODY  1,733,671
RUNNER BLADING AND METHOD OF FORMING THE SAME
Filed July 29, 1922  7 Sheets-Sheet 2

INVENTOR
Lewis F. Moody
BY
Edwards, Sager & Bower
ATTORNEYS

Oct. 29, 1929.  L. F. MOODY  1,733,671
RUNNER BLADING AND METHOD OF FORMING THE SAME
Filed July 29, 1922   7 Sheets-Sheet 4

INVENTOR
Lewis F. Moody
BY
Edwards, Sager & Bower
ATTORNEYS

Oct. 29, 1929.　　　　L. F. MOODY　　　　1,733,671
RUNNER BLADING AND METHOD OF FORMING THE SAME
Filed July 29, 1922　　　7 Sheets-Sheet 5

Patented Oct. 29, 1929

1,733,671

UNITED STATES PATENT OFFICE

LEWIS FERRY MOODY, OF PHILADELPHIA, PENNSYLVANIA

RUNNER BLADING AND METHOD OF FORMING THE SAME

Application filed July 29, 1922. Serial No. 578,388.

This invention relates to runners for hydraulic turbines and the like, and particularly to the blade formation of such runners. In present turbine practice the runner blades have complicated shapes involving a large number of indeterminate variables. Each new problem of design has therefore been met largely by judgment rather than definite calculation, and the result has depended to a considerable extent upon the personal preferences of individual designers. It has been difficult to foretell the performance of a new design of runner from the known operation of prior runners and this has sometimes led to uncertainties and failures to meet requirements.

The chief object of this invention is to overcome these objections to prior runners and provide a system of runner blade surfacing which while efficiently utilizing the water flow involves relatively simple surface contours based on regular geometric lines and surfaces. The runner blades of this invention may for instance have cylindrical, conical or helicoidal surfaces or the like which are geometrically determinable with precision. Such geometrically regular surface contours reduce the number of variable factors involved in the design so that the observed characteristics of known runners may be intelligently used to predetermine the characteristics of different but analogous designs for other installations. This permits a simplification and standardization of the forms of runner blades to a much greater extent than is now possible while at the same time improving the characteristics of individual runners.

A further object of the invention is to provide a form of runner in which the blade surfaces may be accurately and automatically machined to shape by simple mechanisms such as a lathe or boring mill. Present turbine runners are usually cast to shape and any irregularities are removed by a local chipping and grinding. In the runner of this invention the machining of the blade surface permits higher speeds to be realized and greatly improves the efficiency, since in turbines of high specific speed the loss due to surface friction is an important factor. The invention also attains a more exact agreement of the runner characteristics with calculated performance so that less margin over the power rating is required and hydraulic corrosion is reduced on account of the greater smoothness and regularity of the general surface contour resulting from machining, for the local bumps and hollows frequent in the usual cast surfaces tend to cause corrosion.

In the accompanying drawings illustrating the invention

Figure 1:
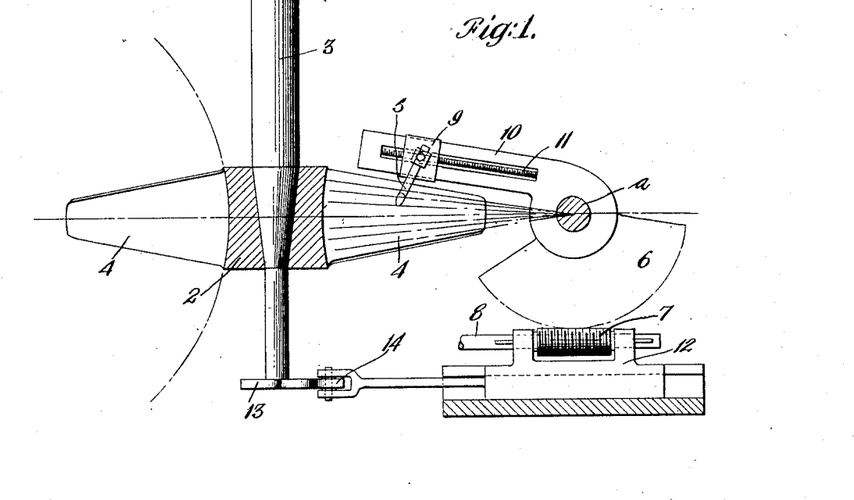
Figs. 1, 2 and 3 are elevational views of runners having blades shaped in accordance with this invention and showing by diagrammatic outline apparatus adapted for the machining of the blades.

In the specific embodiment of the invention shown in Fig. 1 the runner 2 is mounted on a rotatable mandrel 3 the blades 4 of the runner being shown extending at substantially right angles to the runner axis so that the runner is of the axial flow type. During the machining of each blade the mandrel 3 oscillates through an angle sufficient to carry the cutting tool 5 completely across the blade from edge to edge, the tool being simultaneously oscillated around the axis $a$ by the worm wheel segment 6 driven by worm 7 on shaft 8 gear-connected to the mandrel drive (see Fig. 3) so that the oscillating movement of the tool is proportional to the oscillatory movement of the blade. The tool carrier 9 is fed along the arm 10 of the oscillating segment 6 by screw 11 after each cut and thus the tool progresses from tip to hub of the blade on increasingly larger arcs correspondingly increasing the pitch of the blade surface toward the center. This method of surfacing produces a helicoidal surface with the blade pitch greater at the hub and gradually decreasing toward the tips and by varying the ratio of oscillation of the mandrel and tool arm and variously positioning the axis $a$ with respect to the mandrel axis a variety of blade surfaces may be produced adapted for different runners.

In order to provide an additional variation of the contour of the blade surface a special former may be used to additionally control the tool movement and thus give a wider variability. For instance as shown in Fig. 1 the yoke 12 carrying the worm 7 may be slidably mounted and moved by a cam 13 on the mandrel 3, the roller 14 of the yoke member 12 being normally held against said cam by fluid pressure, or by weight or spring, etc. By suitably shaping the peripheral contour of the cam 13 the shape of the blade surface may be varied from a helicoid and in particular the rear surface of the blades may be given a relatively convex shape to strengthen the blade.

Figures 2, 3:
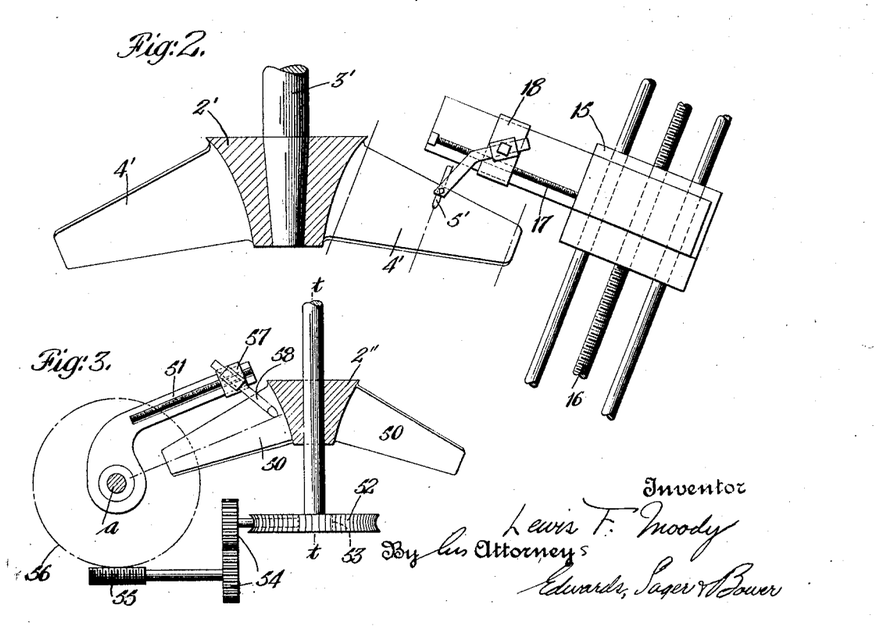

In Fig. 2 the runner 2' has its blades 4' of the diagonally inward flow type with their axes inclined to the runner axis. Such blades may be machined by an oscillating tool of the type shown in Fig. 1 (see Fig. 3) or as shown in Fig. 2 the tool 5' may be reciprocated back and forth with the reciprocatory carrier 15 driven back and forth by the screw drive 16 intergeared with the mandrel 3', a screw feed 17 for the tool carriage 18 being provided to feed the tool lengthwise of the blade. The helicoidal surface produced by this method will have a constant pitch from the hub to the tip of the blade.

In Fig. 3 a runner 2'' of the diagonal inward flow type is shown with apparatus adapted to machine the blade surfaces along a helicoidal pitch increasing toward the hub. In this figure the blades 50 are mounted to rotate around an axis $t$—$t$ and the tool arm 51 is pivotally mounted on an axis $a$ perpendicular to the runner axis but offset from it. The rotation of the tool arm is made proportional to that of the blade 50 by a set of gears comprising the worm gear 52, worm 53, worm 55 and worm gear 56 with intermediate change gears 54 to suit different pitches. The feed motion of tool carrier 57 is in a radial direction from the axis $a$. The tool 58 describes increasingly larger arcs as it progresses toward the hub and thus correspondingly increases the pitch of the blade surface toward the center.

While in Figs. 1, 2 and 3 the axis of rotation of the supporting mandrel coincides with the axis of the runner, this axis of rotation of the mandrel during machining of the blades may be separated from the runner axis if desired to produce a proper configuration of the blade surface with relation to the runner axis. In either Fig. 2 or Fig. 3 additional variation of the tool movement may be provided by a suitable template or cam variation of the tool feed as indicated for instance in connection with the tool feed of Fig. 1.

Figure 4:
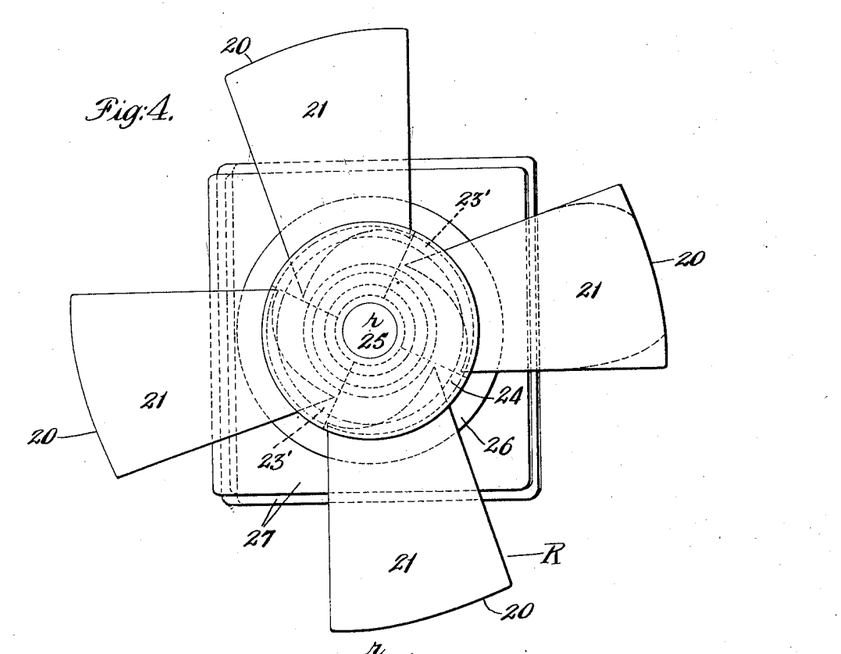
Fig. 4 is a plan view of a runner having blading formed in accordance with this invention and showing means for setting the runner upon a table of a boring mill or the like for machining the blade surfaces.
Figure 5:
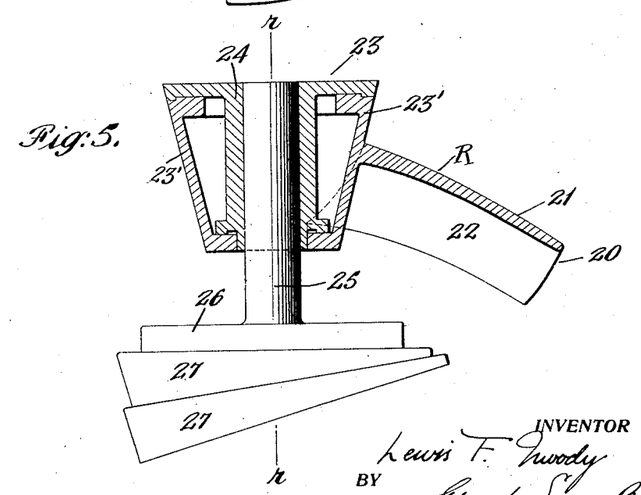
Fig. 5 is a vertical sectional view of Fig. 4, taken on a plane containing the runner axis.

The invention has been explained specifically in connection with runner blades having surfaces based upon helicoids but other forms of geometric surfaces may be used. The runner blade may, for instance, be formed with a conical surface generated by a line in a meridian plane rotating around the axis of the blade surface. Such runner blading is shown in Figs. 4 to 11 in which the runner blading is of homogeneous curvature, that is, everywhere convex or concave on the same side and similar in shape and with the curvature increasing toward the hub. This type of runner blading, I have found, is adaptable for formation in simple manner by shaping the surfaces to correspond to the contours of regular geometric forms. For instance the conical sections of such blades 20 (Figs. 8 and 9) may be made to conform closely to circular arcs with the radius of curvature from section to section increasing toward the tips in such manner that the whole of the convex blading face or back 21 becomes a sector of a conical surface, and the whole of the concave blade back or face 22 becomes a sector of another conical surface. In Figs. 4 and 5 the runner R with four blades 20 has a conical hub 23 with each blade 20 carried on a separate conical section 23' of the hub, each section being detachably mounted in place on the central hub part or spider 24. The elements of the blades 20 are diagonally directed with respect to the runner axis so as to accommodate the blades to a flow directed diagonally or substantially radially inward and downward as indicated by arrows in passage 60, 61 Fig. 7. In the formation of this runner the parts are cast to approximate form and the hub section connections finished to an accurate fit so that the sections may be precisely assembled. The blades 20 may have their surfaces finished in usual manner or preferably they may be machined in a lathe, boring mill or other turning machine.

Figure 6:
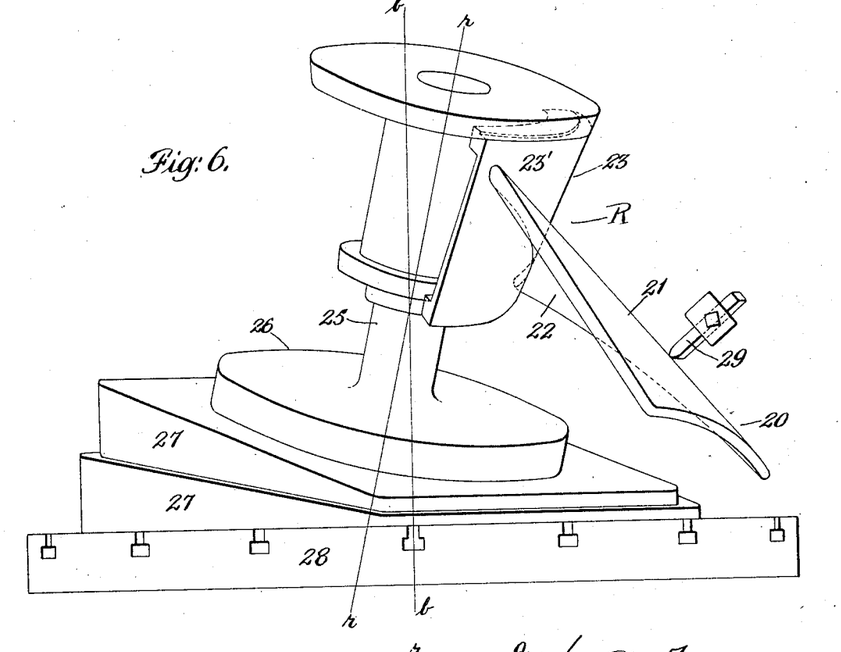
Fig. 6 is a vertical elevational view showing the setting up of a blade on the table of a boring mill for machining the blade face.

In Figs. 4 to 6 the runner R is shown mounted to have its blade surfaces 21 machined to accurate conical contour by a simple turning operation. The runner R is rigidly carried by a mandrel 25 of a pedestal 26 supported on wedge blocks 27, the whole being adapted to be mounted on a turn table 28 of a boring mill (Fig. 6) rotating around a vertical axis $b-b$ so that the axis $r-r$ of the runner is inclined to the plane of rotation of the table. By suitably angled wedge plates 27 and by properly positioning the runner axis $r-r$ with relation to the table axis $b-b$ a blade 20 may be so set that the conical surface 21 desired for it is a sector of a cone coaxial with the axis of rotation $b-b$ of table 28. By rotation or oscillation of the table 28 and feeding of a cutting tool 29 along the pitch line of the cone the conical surface 21 may be smoothly and accurately machined. With this set up of apparatus only one blade will be surfaced at a time, the blades being brought successively into proper position for machining.

Figure 7:
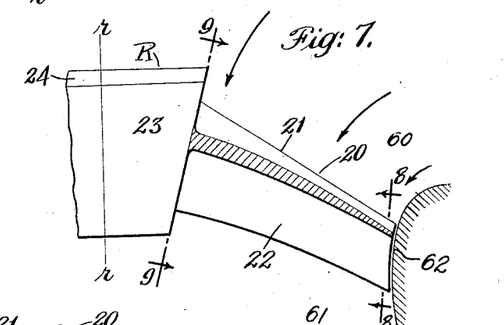
Fig. 7 is a diagrammatic outline of a blade in circular projection on a meridian plane with the sectional form of the blade shown in section and a usual wall forming an intake and discharge passage for the runner.
Figure 8:
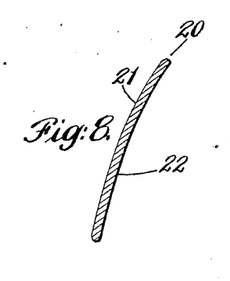
Figs. 8 and 9 are blade sections taken respectively on lines 8—8 and 9—9 of Fig. 7.
Figure 9:
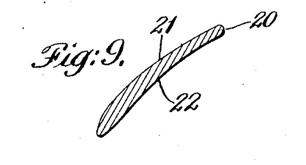
Figure 10:
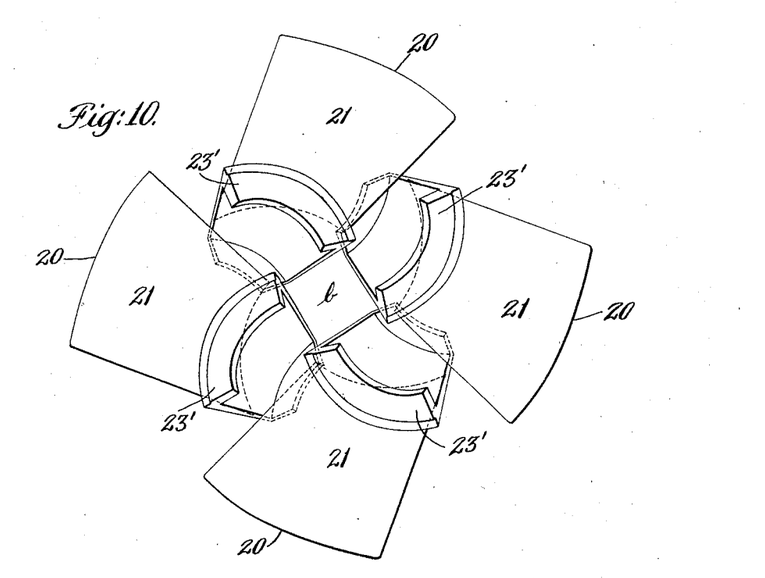
Fig. 10 is a diagrammatic plan view of the blades of Fig. 4 detached and remounted for simultaneous surfacing by machining.
Figure 11:
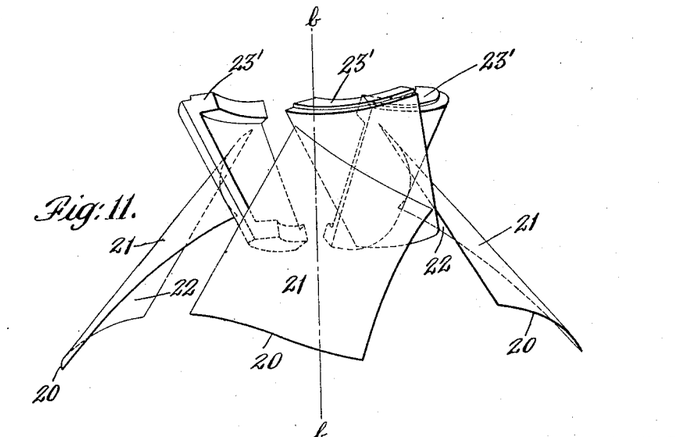
Fig. 11 is an elevation of the blade assembly shown in Fig. 10.

With the conical shaped blading described the form of the blade becomes simple and definite and easy to reproduce with exactness. As shown in Figs. 5 and 7 the meridian sections of the diagonal blades 20 are convex toward the intake instead of curving convexly away from the intake. Such a runner is strong mechanically and being at each point approximately at right angles across diagonal inward flow lines (Fig. 7) is particularly adapted for this type of flow. The smooth machining of the blade surfaces permitted by the simple conical formation gives increased efficiency and higher specific speeds and closer conformity of performance with design. The vane edges can be varied in shape either being practically straight or formed with a curvature similar to that of the convex elements shown in Figs. 5 and 7, or partaking of the curved outline somewhat as shown by dotted lines in Fig. 4.

The concave or rear surfaces 22 may also be similarly machined by inverting the runner R on the mandrel 25 and suitably inclining the runner axis $r-r$ and positioning it with relation to the table axis $b-b$ so that the table axis coincides with the axis of the cone of which the surface 22 is a sector. This machining of the backs of the blades is in many cases highly desirable and important for the reason that the action of the water is such as to set up a higher pressure on the face of the blade than on the back, this difference of pressure being a source of driving force upon the runner. The back is therefore particularly subject to corrosion due to so-called cavitation, and this tendency is guarded against by providing smooth surfaces.

Figure 12:
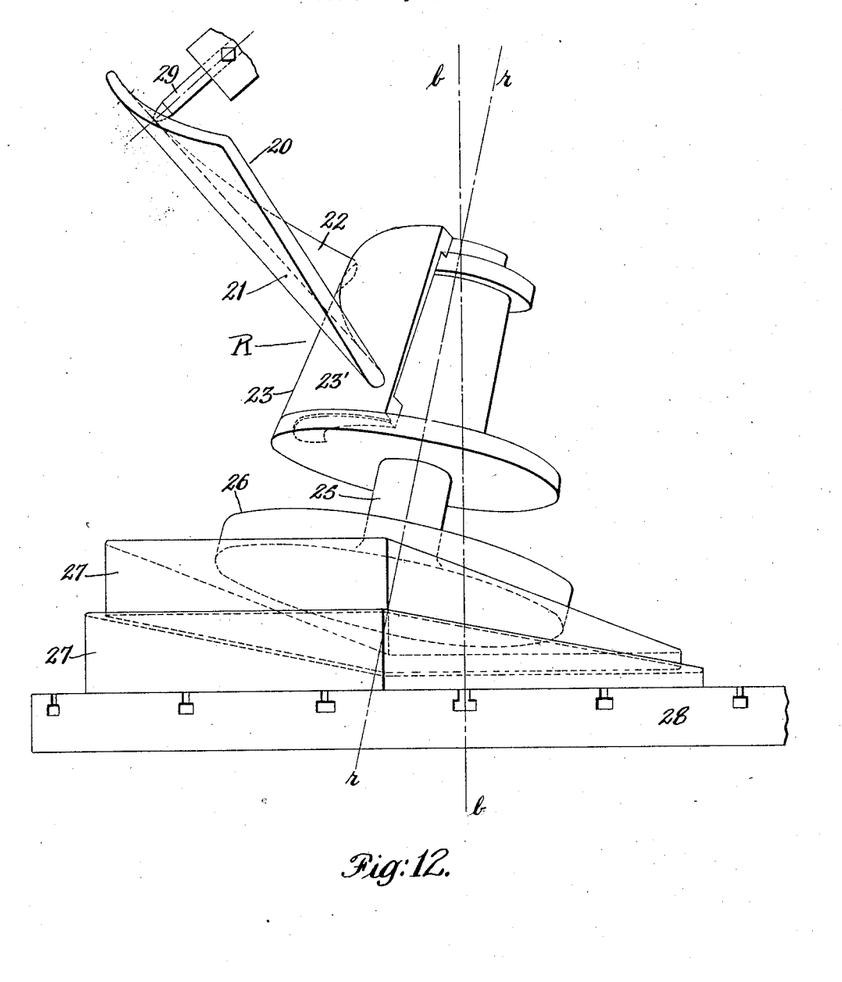
Fig. 12 is an elevational view of a blade mounted for machining of its concave surface.

It may sometimes be advantageous or necessary instead of machining the blades in place on the runner to remove the blade sections from the runner hub and machine them separately, preferably assembling as many of the blades as possible around a central conical axis and in position so that each blade surface is a sector of the cone. All the blades thus assembled may then have their surfaces machined at one operation. For instance as shown diagrammatically in Figs. 10 and 11, the four runner blade sections of the runner R are shown positioned together around a central vertical axis $b-b$ with the convex surfaces 21 of blades 20 forming sectors of a cone around this axis. The hub sections 23' will be gripped by special fixtures and supported in the position shown from the boring mill table. Upon rotation of the table the cutting tool will make a cut around each blade in succession and by feeding the cutting tool along the pitch line of the cone all of the blade surfaces 21 will be machined at the same time. In Fig. 12 a blade section is shown in inverted position and with the inner surfaces 22 of the blade 20 forming sectors of an inverted conical surface having its axis at $b-b$. When thus positioned the inner surfaces 22 of the blades may be machined as shown at one operation in a manner similar to the machining of the outer surfaces shown diagrammatically in Figs. 10 and 11.

In machining the surface of a blade according to the method of this invention it will often be difficult to machine a portion of the vane near the hub during continuous cutting. This portion of the blade will frequently vary somewhat from the true conical surface in order to provide increased mechanical strength by increased thickness and fillets where the blade joins the hub. In practice therefore the inner portion of each blade nearest the hub will in general be finished by chipping and hand finishing, the machine finishing being used for the remainder of the blade surface. The surfacing of the innermost portions of the blades is relatively unimportant and it is the outermost portions of the vanes that it is most important to finish accurately by machining since the relative velocity at these outermost portions with respect to the water is high and accuracy of surface contour is of much greater importance in this part of the blade.

Figures 13, 14, 15, 16:
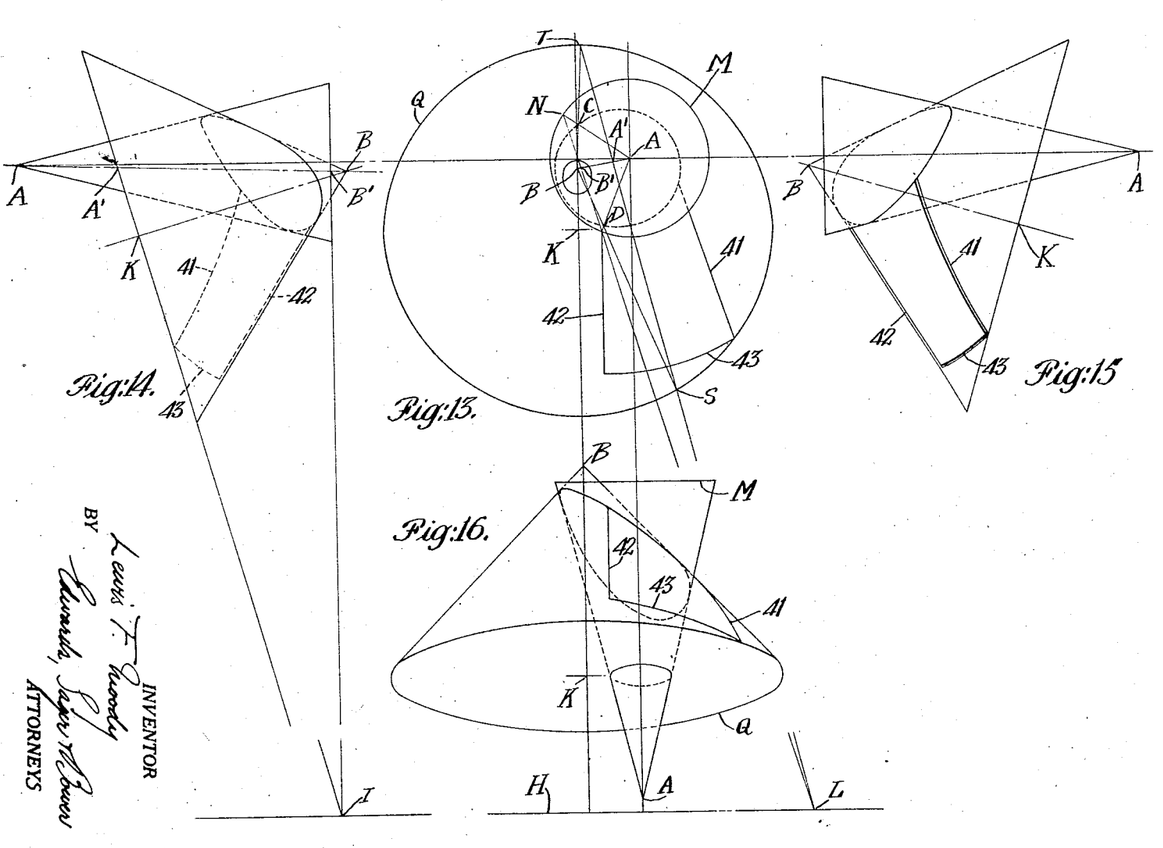
Fig. 13 is a diagrammatic plan view of intersecting geometrical figures illustrating a method of determining the runner blade contour.
Figs. 14, 15 and 16 are left side, right side and elevational views respectively of the figures shown in Fig. 12.
Figure 17:
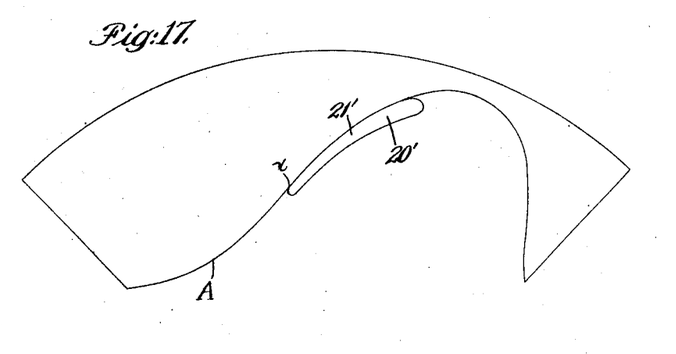
Fig. 17 is a diagrammatic development of the intersection of the blade surfaces with the hub cone.

In order to explain the geometrical construction of the conical type of surface and its relation to the conical sections taken in the direction of flow, Figs. 13 to 18 illustrate diagrammatically a method of determination of a blade surface such as 21 of Figs. 4 to 12. Fig. 13 is a plan view looking vertically downward upon a runner placed in its usual position with vertical axis. The runner axis appears as a point at A and the circle M about this point as center is the outline of the base of a cone representing the runner hub. Since the conical hub 23 of the runner is taken in the direction of flow of water through the runner at the inner end of the blades, the conical hub may be taken to represent any one of such flow sections. Similar sections would be taken across the runner blades at the outer tips and at intermediate points, each flow section thus being in a separate conical surface.

The edges of the blade 20' are shown at 41 and 42, each being here taken as a straight line when seen in this projection. These edges will usually have curved contours rather than the straight lines here shown for simplicity of illustration. The blade tip is shown by line 43. The upper surface 21' of the blade lies in a cone, the apex of which is at B and the axis B—K.

For convenience, the cone representing the surface 21' of the blade 20' has been terminated in a base normal to its axis passing through the point K.

Fig. 14 is a side elevation, looking on the left side of the central view. The cone representing the runner hub 23' or conical section is seen with its vertex pointing downward at A and its base at the top of this figure. The cone representing the conical blade surface is seen with its apex at the top of the figure at B and its base in a diagonal plane below. Fig. 15 is a side elevation looking on the right-hand side of the plan view. This right-hand side elevation is the direct reverse of Fig. 14. The vane edges which are lines lying in the surface of the cone are indicated by the numbers 41, 42 and 43. The cone representing the runner hub or conical flow section will be referred to as cone A, corresponding to its apex, and the cone representing the blade surface will be referred to as cone B from its apex. In order to show the shape of the flow sections which are obtained when a conical surface is used for the blade in accordance with this invention, it may be supposed that the surface of cone A is unwrapped and developed on a plane surface. The line of intersection of this cone with cone B will appear on this development and will show the shape of the flow section obtained in a blade of this form.

In order to explain the method of designing a runner according to this invention, the geometrical construction for obtaining the intersection of the two cones and for locating this intersection on the flow section or cone A will be briefly explained as follows:

Referring to Fig. 14 the planes forming the bases of the two cones A and B are shown extended until they meet in the line shown by the point I. In the plan view, this intersection of the two bases will appear as a horizontal line H shown near the bottom of the sheet. The method of obtaining the intersection of the two cones will be clear if it is illustrated for one point. The first step is to draw an auxiliary construction line A—B connecting the apices of the two cones. A series of planes may now be drawn each containing this line. Every one of such planes will cut from each of the two cones two elements which are also straight lines, and where an element of one cone intersects an element of the other cone will be a point on the intersection of the two cones. It will be sufficient to show this for one such auxiliary plane.

The auxiliary line A—B pierces the bases of the two cones at A' and B', respectively, and therefore an auxiliary plane containing the line A—B will intersect the two bases in lines passing through the points A' and B'. Two such lines are shown at A' L and B' L, the lines A' L and B' L being the traces of the auxiliary plane on the bases of both cones. These traces of course intersect at L in the line I—L which is the intersection of the two bases. Having drawn two such lines as A' L and B' L, it is now only necessary to find where these lines intersect the peripheries of the bases of the two cones. The base of cone A is bounded by the circle M, which is intersected by the line B' L at N and P. The base of the cone B is bounded by the ellipse Q. It is unnecessary to give the construction for drawing this ellipse since it is merely the projection of the corresponding circle in the side elevation. The line A' L intersects the ellipse Q at T and S. Connecting P and N with A, we have two elements of the cone A; and connecting B with T and S, we have two elements of the cone B. All of these elements are in one plane, namely, the auxiliary plane B' L A'. The corresponding elements will therefore intersect each other. Thus A N and B T intersect at C; and A P and B S intersect at D. These two points are accordingly points on the intersection of the two cones.

Figure 18:
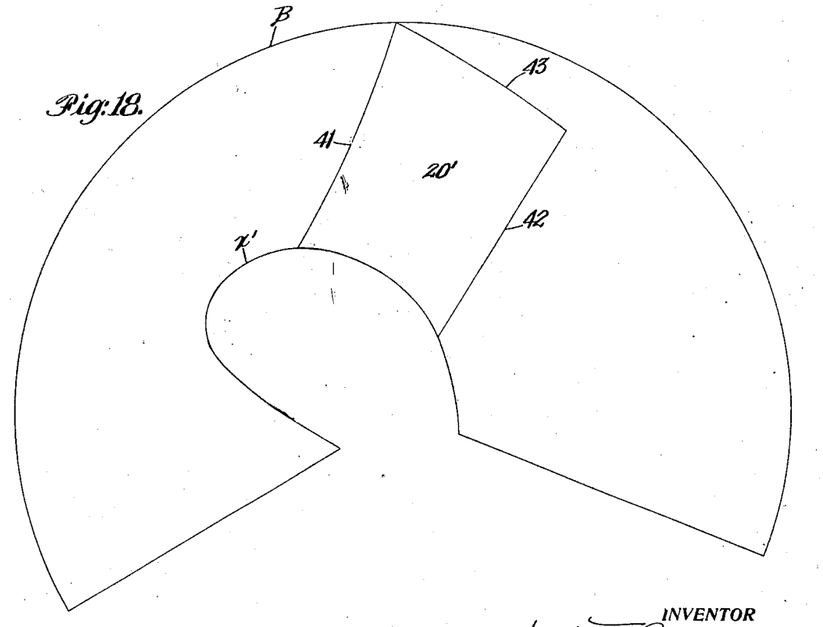
Fig. 18 is a diagrammatic development of the intersection of the blade edges on the blade cone.

By repeating the above construction, a series of such points is obtained and a curve drawn through them is the line of intersection desired. In order to find the shape of the blade surface in a cross section taken in the direction of flow, the surface of the cone A is now developed into a plane and the intersection $x$ of the two cones just found will appear on this development as shown at 21' in Fig. 17. In this figure is shown in dotted lines the position of the blade 20' in the intersection. It will be noted that by shifting the position of the blade 20', various blade forms can be obtained coresponding to different portions of the intersection $x$; thus the designer is given the opportunity to vary the blade shape through a considerable range by shifting the position of the blade along the curve $x$ of intersection, and a still wider field of variation can be obtained by using different proportions and positions for cone B. In Fig. 18 is a development of the blade 20' outlined on the plane development of the blade cone B. The line of intersection between the cones is shown at X' and the blade edges at 41, 42, 43.

By the use of a simple form of surface, such as the helicoidal or conical surfaces here proposed a highly desirable simplification and standardization of the forms of runner blades is made possible. For example, if a series of runners is built with helicoidal surfaces, the blade contours can all be of similar form such for example as straight or elliptical edges but of different relative widths; and it then becomes possible to specify the blade form completely by a small number of numerical factors such as the pitch ratio of the helicoid and width or area ratio of the blade surface. The standardization can be carried still further and made to cover the form of blade section and variation of thickness. For example, if the back of the blade is given the form of a circular arc in cross section, in all runners of a set, the form of blade section is thus standardized. While the invention has been described with particular reference to turbine runners of the diagonal inward flow or axial flow type it is also applicable to runners of the diagonal outward flow type, but either type would have an intake and discharge generally indicated at 60 and 61 respectively, the runner tips being close to the ring 62 shown in Fig. 7; and the principle of the invention is not confined to the specific examples shown but is intended to cover any modifications within the scope of the appended claims.

I claim:—

1. A turbine runner blade having meridian sections of the face convex and meridian sections of the back concave.

2. A runner blade for a diagonal inward flow turbine having meridian sections convex toward the intake side of the runner.

3. A runner blade for a diagonal inward flow turbine having meridian sections concave toward the draft tube side of the runner.

4. A machine surfaced runner blade for the runner of a diagonal inward flow hydraulic turbine having meridian sections convex toward the intake side of the runner.

5. A machine surfaced runner blade for a diagonal inward flow hydraulic turbine having meridian sections of the blade concave toward the draft tube side of the runner.

6. A machine surfaced runner blade, for a hydraulic turbine having meridian sections of the blade face convex and meridian sections of the back concave.

7. A runner blade for the runner of a diagonal inward flow turbine, the meridian sections of said blade being lines oblique to the axis near the tips and approaching perpendicularity to said axis as the runner hub is approached.

8. A runner blade for the runner of a diagonal flow hydraulic turbine, the meridian sections of said blade being lines oblique to the axis near the tips and approaching perpendicularity to said axis as the runner hub is approached.

9. In combination, a runner in a rotary hydraulic machine having blade surfaces formed as surfaces of revolution, and means forming an intake and discharge passage for said runner, said passage turning from a substantially radial toward an axial direction.

10. In combination, a turbine runner having blade surfaces formed as surfaces of revolution generated by a straight line, and means forming an intake and discharge passage for said runner and the driving face of the runner blades being engaged by fluid flowing toward the runner.

11. A turbine runner having blade surfaces formed as surfaces of revolution generated by a straight line at constant position relatively to the axis of revolution.

12. In combination, a hydraulic turbine runner having conical blade surfaces, and means forming an intake and discharge passage for said runner, whereby the driving face of the runner blades is engaged by fluid flowing toward the runner.

13. In combination, a hydraulic turbine runner having blade surfaces machined as surfaces of revolution and means forming an intake and discharge passage for said runner, said passage turning from a substantially radial toward an axial direction.

14. In combination, a hydraulic turbine runner having blade surfaces machined as surfaces of revolution generated by a straight line and means forming an intake and discharge passage for said runner, said passage turning from a substantially radial toward an axial direction.

15. A turbine runner having blade surfaces machined as surfaces of revolution generated by a straight line at constant angle to the axis of revolution.

16. In combination, a hydraulic turbine runner having blade surfaces machined as conical surfaces, and means forming an intake and discharge passage for said runner, said passage turning from a substantially radial to an axial direction and the driving face of the runner blades being engaged by fluid flowing toward the runner.

17. In combination, a hydraulic turbine runner having front and back blade surfaces formed as surfaces of revolution, and means forming an intake and discharge passage for said runner, said passage turning from a substantially radial to an axial direction and the driving face of the runner blades being engaged by fluid flowing toward the runner.

18. In combination, a hydraulic turbine runner having front and back blade surfaces formed as surfaces of revolution, generated by a straight line, and means forming an intake and discharge passage for said runner, said passage turning from a substantially radial to an axial direction and the driving face of the runner blades being engaged by fluid flowing toward the runner.

19. A turbine runner having front and back blade surfaces formed as surfaces of revolution generated by a straight line at constant angle to the axis of revolution.

20. In combination, a hydraulic rotary machine provided with a runner having detachable blades with surfaces formed as surfaces of revolution and means forming an intake and discharge passage for said runner, said passage turning from a substantially radial toward an axial direction.

21. In combination, a hydraulic turbine runner having detachable blades with surfaces formed as surfaces of revolution generated by a straight line, and means forming an intake and discharge passage for said runner, whereby the driving face of the runner blades is engaged by fluid flowing toward the runner.

22. A turbine runner having detachable blades with surfaces formed as surfaces of revolution generated by a straight line at constant angle to the axis of revolution.

23. A turbine runner having detachable blades with surfaces formed as surfaces of revolution generated by a line at constant angle to the axis of revolution.

24. A turbine runner having blade surfaces formed as surfaces of revolution, the axes of revolution being inclined to the runner axis.

25. A turbine having blade surfaces formed as surfaces of revolution generated by a straight line, the axes of revolution being inclined to the runner axis.

26. A turbine runner having blade surfaces formed as surfaces of revolution generated by a straight line at constant angle to the axis of revolution, the axes of revolution being inclined to the runner axis.

27. A turbine runner having blade surfaces formed as surfaces of revolution generated by a line at constant angle to the axis of revolution, the axes of revolution being inclined to the runner axis.

28. A runner for a turbine or the like having blade surfaces formed as conical surfaces and with the axes of the cones inclined to the runner axis.

29. A runner for a turbine or the like having front and back blade surfaces formed as conical surfaces and with the axes of the cones inclined to the runner axis.

30. A runner for a turbine or the like having front and back machined blade surfaces formed as conical surfaces and with the axes of the cones inclined to the runner axis.

31. A runner for a turbine or the like having detachable blades with surfaces formed as conical surfaces and with the axes of the cones inclined to the runner axis.

32. In combination, a hydraulic turbine runner having surfaces composed of straight line elements, said surfaces being machine finished, and means forming an intake and discharge passage for said runner, said passage turning from a substantially radial toward an axial direction and the driving face of the runner blades being engaged by fluid flowing toward the runner.

33. In combination, a hydraulic turbine runner having surfaces composed of straight line elements, said surfaces being machined by continuous relative rotary movement of the cutting tool from edge to edge of the blades, and means forming an intake and discharge passage for said runner, said passage turning from a substantially radial toward an axial direction and the driving face of the runner blades being engaegd by fluid flowing toward the runner.

34. In a hydraulic turbine a series of guide vanes controlling the direction of the entering flow and a runner having blades diagonal to the turbine axis and having meridian sections concave toward said axis.

35. In a hydraulic turbine a series of guide vanes controlling the direction of the entering flow and a runner having unshrouded blades diagonal to the turbine axis and having meridian sections concave toward said axis.

36. A turbine runner having blade surfaces formed as surfaces of revolution generated by a straight line, said blade having its greatest thickness at an intermediate point between the entrance and discharge edges.

37. The combination in a hydraulic turbine comprising a runner having blade surfaces defined by a movable element, the movement thereof including rotation about an axis to form a surface of revolution, and means forming an intake and discharge for said runner, said passage turning from a substantially radial toward an axial direction while the driving face of the runner blades is engaged by fluid flowing toward the runner.

38. The combination as set forth in claim 37 further characterized in that said movable element is a straight line.

39. The combination as set forth in claim 37 further characterized in that said element is inclined to the rotor axis.

40. The combination as set forth in claim 37 further characterized in that the blade surfaces are relatively flat in the direction of flow thereover.

LEWIS FERRY MOODY.